United States Patent Office 3,050,329
Patented Aug. 21, 1962

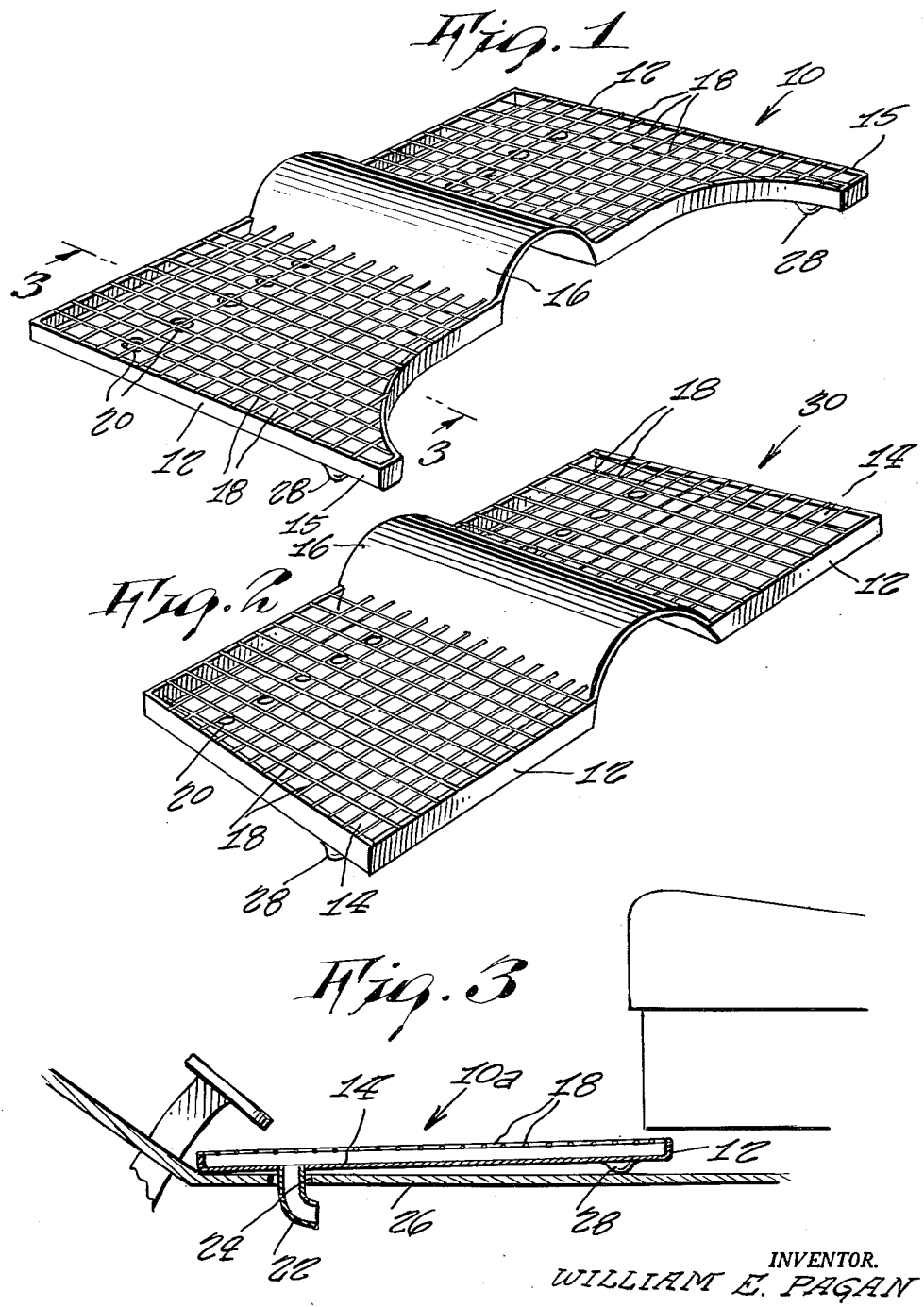

3,050,329
CAR FLOOR SANITIZER
William E. Pagan, 159—21 Hillside Ave., Jamaica, N.Y.
Filed Aug. 16, 1960, Ser. No. 49,962
2 Claims. (Cl. 296—1)

This invention relates to automotive vehicles and, more particularly, to accessories therefor.

It is an object of the present invention to provide a device for installation upon the floor of an automotive vehicle which will facilitate the draining of snow, rain, and moisture from the interior of the vehicle under all types of weather conditions.

Still another object of the present invention is to provide a car floor sanitizer which can be readily installed in all types of new model and existing vehicles, and which will effectively prevent the accumulation of water and moisture within the interior of the vehicle.

Still an additional object of the present invention is to provide a car floor sanitizer of the type described which will not interfere with the ordinary driving of the vehicle, is comfortable to the driver and passengers, and which will not permanently damage or mar the interior of the vehicle.

All of the foregoing and still further objects and advantages of this invention will become apparent from a study of the following specification, taken in conjunction with the accompanying drawing, wherein:

FIGURE 1 is a perspective view of a car floor sanitizer made in accordance with the present invention especially designed for installation in the front part of a vehicle;

FIGURE 2 is a view similar to FIGURE 1, showing a slightly modified device for installation in the rear seat section of the vehicle; and FIGURE 3 is a fragmentary cross sectional view of a device made in accordance with the present invention in actual use.

Referring now to the drawing, a car floor sanitizer 10 made in accordance with the present invention is shown to include a main formed section having a pair of shallow trays 12 that are integrally joined together in spaced apart relationship by means of a central bridge portion 16 which will accommodate therewithin the drive shaft tunnel usually present in most automotive vehicles having a front engine and rear wheel drive.

The top of each of the upwardly opening trays 12 is covered with a wire mesh type weight supporting screen 18 formed from a plurality of perpendicularly intersecting cross wires 18. These wires are taut enough to comfortably support the feet of a driver or passenger, and maintain the feet in spaced relationship with the bottom of the trays 12. The forward end of each tray 12 is further provided with a plurality of downwardly depending drain spouts 22 that are received within openings 24 in the floor 26 of the vehicle. The opposite rear end of each such tray section 12 is provided with depending feet 28 which elevate that end of the trays to a point above the level of the opening into the drain spouts 22. Thus, any water collecting within the trays is immediately drained out through the drain spouts 22 and discharged beneath the vehicle.

In the embodiment shown in FIGURE 1 of the drawing, each tray section 12 is further provided with a rearwardly projecting wing section 15 which extends around the sides of the front seat of the vehicle so as to provide for the accumulation and discharge of all moisture entering or dropping onto the front of the vehicle floor section.

In FIGURE 2 of the drawing, however, the assembly 30 is substantially identical to that shown in FIGURE 1 except that it is devoid of the rearwardly projecting wings 15 of the trays 12, so as to be more suitable for installation within the rear section of the vehicle. Other than for the elimination of the wings 15, the embodiment shown in FIGURE 2 is substantially identical to that shown in FIGURE 1.

It will now be appreciated that in all forms of the present invention, a device has been provided which may be conveniently installed in all new model and existing vehicles with a minimum amount of effort. In actual use, however, the fact that such devices will continuously drain all moisture out of the vehicle serves to prolong the normal life of the interior of the vehicle, prevents dampness within the vehicle in inclement weather, and the like.

When this device is not in use, it is a simple matter to cover the top thereof with any suitable covering, or to remove such from the vehicle, in which case the openings 24 through the floor 26 may be filled, such as with corks or stoppers.

While this invention has been described with particular reference to the construction shown in the drawing, it is to be understood that such is not to be construed as imparting limitations upon the invention, which is best defined by the claims appended hereto.

Having thus described my invention, I claim as new and desire to secure by Letters Patent:

1. A car floor sanitizer comprising, in combination, a tray assembly for supported engagement upon a selected portion of the floor of an automotive vehicle, mesh type weight supporting means secured to said tray assembly spaced from the bottom of said tray assembly, drain means depending from one end of said tray assembly for discharging liquid matter out of the vehicle from said tray assembly, pedestal means carried by and elevating the opposite end of said tray assembly above the level of said one end thereof, said tray assembly comprising a pair of substantially identical tray sections, a centrally downwardly concave bridge portion integrally connecting said tray sections together, said bridge portion accommodating upwardly the drive shaft tunnel therewithin, and said mesh type weight supporting means comprising a plurality of perpendicularly intersecting rods defining a substantially rigid floor above the bottom of said tray assembly, said drain means comprising a plurality of drain outlets integral with and depending from said one end of said tray assembly, said outlets being receivable through openings in the floor of the vehicle, for draining moisture from the interior of the tray assembly outwardly of the vehicle.

2. A car floor sanitizer as set forth in claim 1, wherein said pedestal means comprises a plurality of depending feet integral with said opposite end of said tray assembly for supported engagement upon the floor of the vehicle.

References Cited in the file of this patent

UNITED STATES PATENTS

| | | |
|---|---|---|
| 899,515 | De Lapp | Sept. 29, 1908 |
| 1,569,934 | Izzo | Jan. 19, 1926 |
| 1,698,005 | Stanwood | Jan. 8, 1929 |
| 2,650,855 | Peirce | Sept. 1, 1953 |
| 2,793,149 | Richter | May 21, 1957 |

FOREIGN PATENTS

| | | |
|---|---|---|
| 1,130,448 | France | Feb. 5, 1957 |